US012711731B2

(12) United States Patent
Ye et al.

(10) Patent No.: US 12,711,731 B2
(45) Date of Patent: Aug. 18, 2026

(54) DEVICE AND METHOD FOR PREDICTING COLLISION AREA OF HIGH SPEED SMALL OBJECT

(71) Applicant: Industrial Technology Research Institute, Hsinchu (TW)

(72) Inventors: Shu-Hao Ye, Hsinchu County (TW); Chi-Tien Sun, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 327 days.

(21) Appl. No.: 18/389,677

(22) Filed: Dec. 19, 2023

(65) Prior Publication Data

US 2025/0173998 A1 May 29, 2025

(30) Foreign Application Priority Data

Nov. 28, 2023 (TW) ................................ 112146045

(51) Int. Cl.

| | |
|---|---|
| ***G06V 10/62*** | (2022.01) |
| ***G06V 10/26*** | (2022.01) |
| ***G06V 10/774*** | (2022.01) |
| ***G06V 10/82*** | (2022.01) |
| ***G06V 20/52*** | (2022.01) |
| *G08G 9/02* | (2006.01) |

(52) U.S. Cl.

CPC .............. *G06V 10/62* (2022.01); *G06V 10/26* (2022.01); *G06V 10/774* (2022.01); *G06V 10/82* (2022.01); *G06V 20/52* (2022.01); *G08G 9/02* (2013.01)

(58) Field of Classification Search

CPC ........ G06V 10/62; G06V 20/52; G06V 10/82; G06V 10/26; G06V 10/774; G08G 9/02

See application file for complete search history.

(56) References Cited

U.S. PATENT DOCUMENTS

| | | | | |
|---|---|---|---|---|
| 2018/0262708 | A1* | 9/2018 | Lee | H04N 21/4728 |
| 2022/0128702 | A1 | 4/2022 | Ziglar et al. | |
| 2022/0197312 | A1* | 6/2022 | Vemprala | G06N 3/08 |

(Continued)

FOREIGN PATENT DOCUMENTS

| | | |
|---|---|---|
| CN | 113762473 | 12/2021 |
| CN | 114359714 | 4/2022 |

(Continued)

OTHER PUBLICATIONS

"Office Action of Taiwan Counterpart Application", issued on May 30, 2024, p. 1-p. 7.

(Continued)

*Primary Examiner* — Syed Haider

(74) *Attorney, Agent, or Firm* — JCIPRNET

(57) ABSTRACT

Disclosed are a device and a method for predicting a collision area of a high speed small object. The method includes: obtaining, by a processor, a sparse event stream data through an event camera; obtaining, by the processor, an event stream data corresponding to a cumulative time interval by using the sparse event stream data; predicting, by (Continued)

the processor, a collision area category by using a temporal spatial feature expression associated with the event stream data, wherein the collision area category corresponds to a high speed small object, and outputting, by the processor, the collision area category.

10 Claims, 4 Drawing Sheets

(56) References Cited

U.S. PATENT DOCUMENTS

| | | | | |
|---|---|---|---|---|
| 2022/0383640 | A1* | 12/2022 | Vora | G06V 10/40 |
| 2023/0048926 | A1 | 2/2023 | Kurbiel et al. | |
| 2023/0136306 | A1* | 5/2023 | Wang | A63B 65/12<br>382/107 |
| 2024/0025444 | A1* | 1/2024 | Omari | B60W 60/0015 |

FOREIGN PATENT DOCUMENTS

| | | |
|---|---|---|
| CN | 114587220 | 6/2022 |
| CN | 115494856 | 12/2022 |
| CN | 115601727 | 1/2023 |
| CN | 116246492 | 6/2023 |

OTHER PUBLICATIONS

Baotao He et al., “Fast-Dynamic-Vision: Detection and Tracking Dynamic Objects with Event and Depth Sensing”, 2021 IEEE/RSJ International Conference on Intelligent Robots and Systems (IROS), Sep. 2021, pp. 3071-3078.

Davide Falanga et al., “Dynamic obstacle avoidance for quadrotors with event cameras”, Science Robotics, vol. 5, Mar. 2020, pp. 1-15.

Celyn Walters et al., “EVReflex: Dense Time-to-Impact Prediction for Event-based Obstacle Avoidance”, 2021 IEEE/RSJ International Conference on Intelligent Robots and Systems (IROS), Sep. 2021, pp. 1304-1309.

Benedek Forrai et al., “Event-based Agile Object Catching with a Quadrupedal Robot”, IEEE International Conference on Robotics and Automation (ICRA), Mar. 2023, pp. 1-7.

Ziyun Wang et al., “EV-Catcher: High-Speed Object Catching Using Low-Latency Event-Based Neural Networks”, IEEE Robotics and Automation Letters, vol. 7, Oct. 2022, pp. 8737-8744.

* cited by examiner

DEVICE AND METHOD FOR PREDICTING COLLISION AREA OF HIGH SPEED SMALL OBJECT

CROSS-REFERENCE TO RELATED APPLICATION

This application claims the priority benefit of Taiwan application serial no. 112146045, filed on Nov. 28, 2023. The entirety of the above-mentioned patent application is hereby incorporated by reference herein and made a part of this specification.

TECHNICAL FIELD

The disclosure relates to a device and a method for predicting a collision area of a high speed small object.

BACKGROUND

Currently, it is difficult for general drones or self-driving cars to effectively dodge active attacks from high speed small objects. In particular, the types of the high speed small objects are difficult to identify immediately, which further increases the difficulty for the drones or the self-driving cars to avoid the high speed small objects.

SUMMARY

The disclosure provides a device and a method for predicting a collision area of a high speed small object, which may effectively predict the collision area of the high speed small object.

The device for predicting the collision area of the high speed small object of the disclosure includes an event camera and a processor. The processor is coupled to the event camera, where the processor obtains a sparse event stream data through the event camera. The processor obtains an event stream data corresponding to a cumulative time interval by using the sparse event stream data. The processor predicts a collision area category by using a temporal spatial feature expression associated with the event stream data, where the collision area category corresponds to the high speed small object. The processor outputs the collision area category.

The method for predicting the collision area of the high speed small object of the disclosure includes: obtaining, by the processor, a sparse event stream data through the event camera, obtaining, by the processor, an event stream data corresponding to a cumulative time interval by using the sparse event stream data, predicting, by the processor, a collision area category by using a temporal spatial feature expression associated with the event stream data, where the collision area category corresponds to the high speed small object, and outputting, by the processor, the collision area category.

Based on the above, the device and the method for predicting the collision area of the high speed small object of the disclosure may obtain the event stream data based on the event camera. Afterwards, the temporal spatial feature expression is used to predict the collision area category of the high speed small object. Even if the object type of the high speed small object is unknown, the disclosure may effectively predict the collision area category of the high speed small object based on the event stream data, so that the drone or the self-driving car may effectively avoid these high speed small objects.

DETAILED DESCRIPTION OF DISCLOSED EMBODIMENTS

Figure 1:
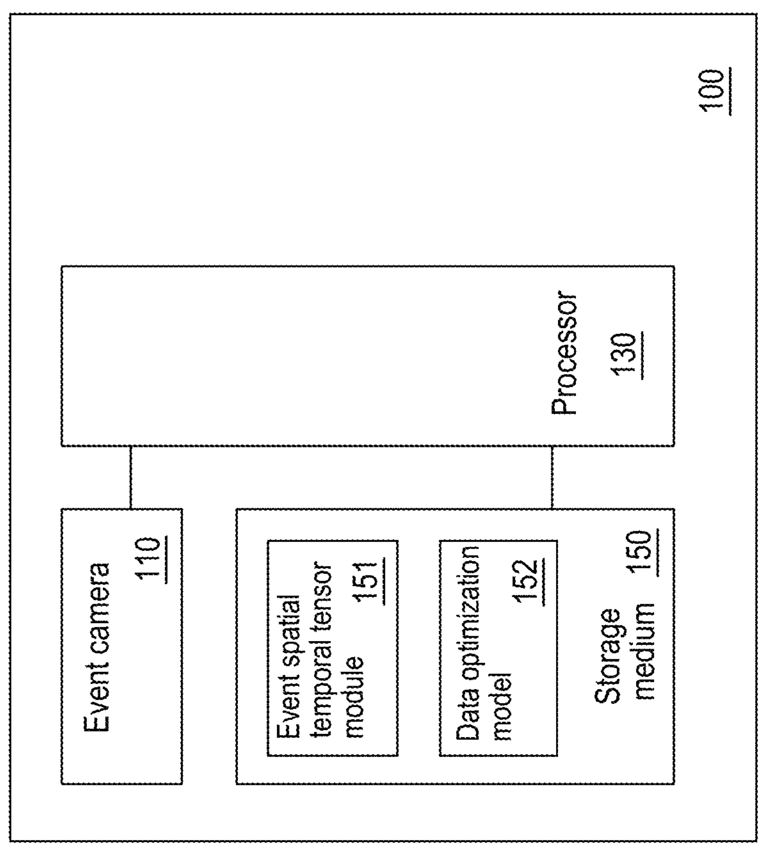
FIG. 1 is a schematic diagram illustrating a device for predicting a collision area of a high speed small object according to an embodiment of the disclosure.

FIG. 1 is a schematic diagram illustrating a device 100 for predicting a collision area of a high speed small object according to an embodiment of the disclosure. The device 100 may include an event camera 110 and a processor 130. In other embodiments, the device 100 may further include a storage medium 150 coupled to the processor 130. In an embodiment, the storage medium 150 may store an event spatial temporal tensor (ESTT) module 151 and a data optimization model 152, and the processor 130 may access and execute the ESTT module 151 and the data optimization model 152. In an embodiment, the storage medium 150 may further store a neural network (unillustrated in FIG. 1). Subsequent embodiments further illustrate the usages of the ESTT module 151, the data optimization model 152, and the neural network. In an embodiment, the device 100 may be installed on a drone or a self-driving car. In this embodiment, the processor 130 is, for example, a central processing unit (CPU), or a programmable micro control unit (MCU) for a common purpose or a specific purpose, a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable logic gate array (FPGA), or other similar components or the combinations thereof. The storage medium 150 is, for example, a fixed or movable random access memory (RAM), a read-only memory (ROM), a flash memory, a hard disk drive (HDD), a solid state drive (SSD) in any form, or other similar components or the combinations thereof, and is configured to store multiple modules or various application programs executed by the processor 130.

Figure 2:
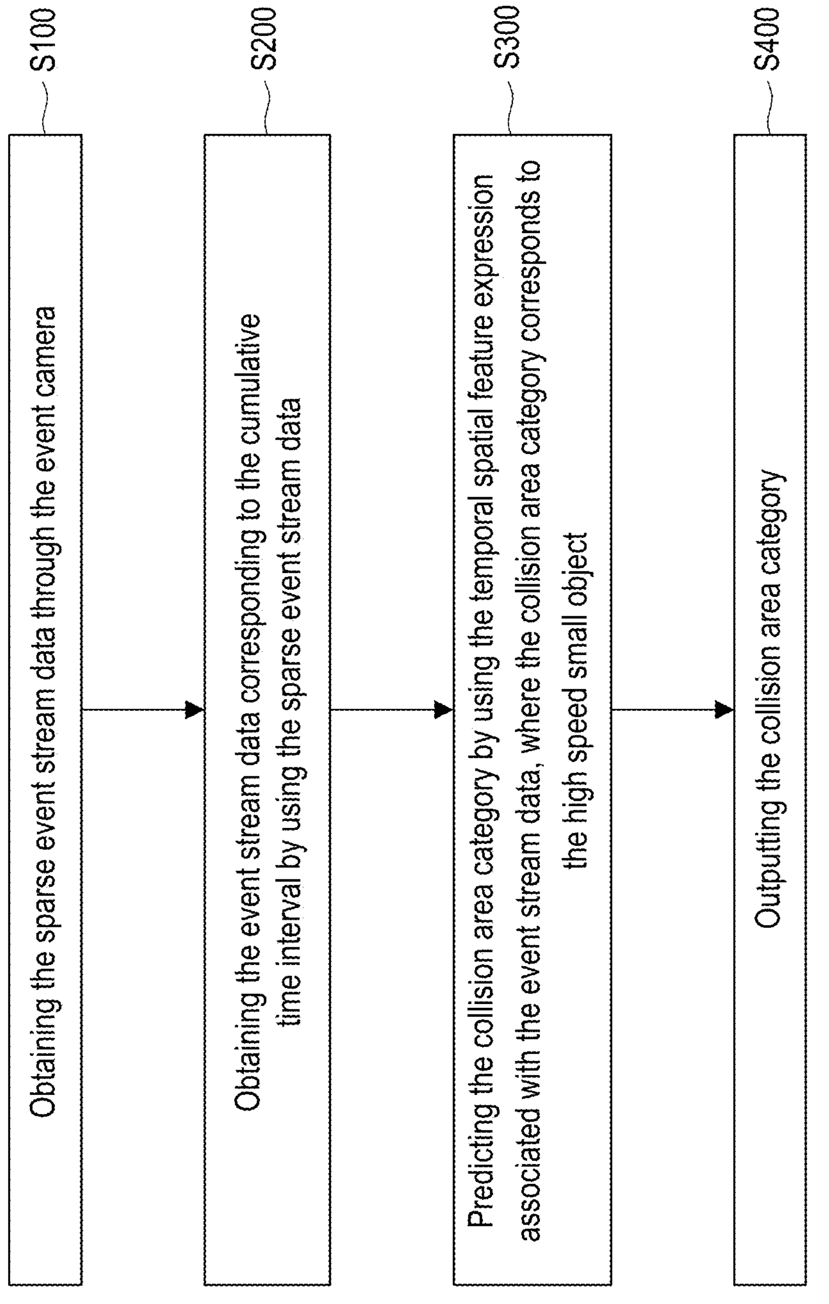
FIG. 2 is a flowchart illustrating a method for predicting a collision area of a high speed small object according to an embodiment of the disclosure.

FIG. 2 is a flowchart illustrating a method for predicting a collision area of a high speed small object according to an embodiment of the disclosure. Please refer to both FIG. 1 and FIG. 2 at the same time.

In step S100, the processor 130 may obtain a sparse event stream data through the event camera 110.

In step S200, the processor 130 may obtain an event stream data corresponding to a cumulative time interval by using the sparse event stream data. In detail, the event camera 110 outputs a single pixel whenever the brightness of a single pixel changes. In order to predict a more accurate collision area category in the subsequent step S300, the processor 130 may obtain all pixels output by the event camera 110 within the cumulative time interval from the sparse event stream data so as to obtain the event stream data. Further, the event stream data may include a plurality of events.

In step S300, the processor 130 may predict a collision area category by using a temporal spatial feature expression associated with the event stream data, where the collision area category may correspond to the high speed small object. In an embodiment, a speed of the high speed small object may be greater than 30 m/s, and a size of the high speed small object may be less than 2 cm. In other words, in response to an active attack from the high speed small object, the device 100 of the disclosure does not need to first determine the type of the high speed small object, and may predict which collision area of the drone or the self-driving car that the high speed small object collides with.

Figure 3:
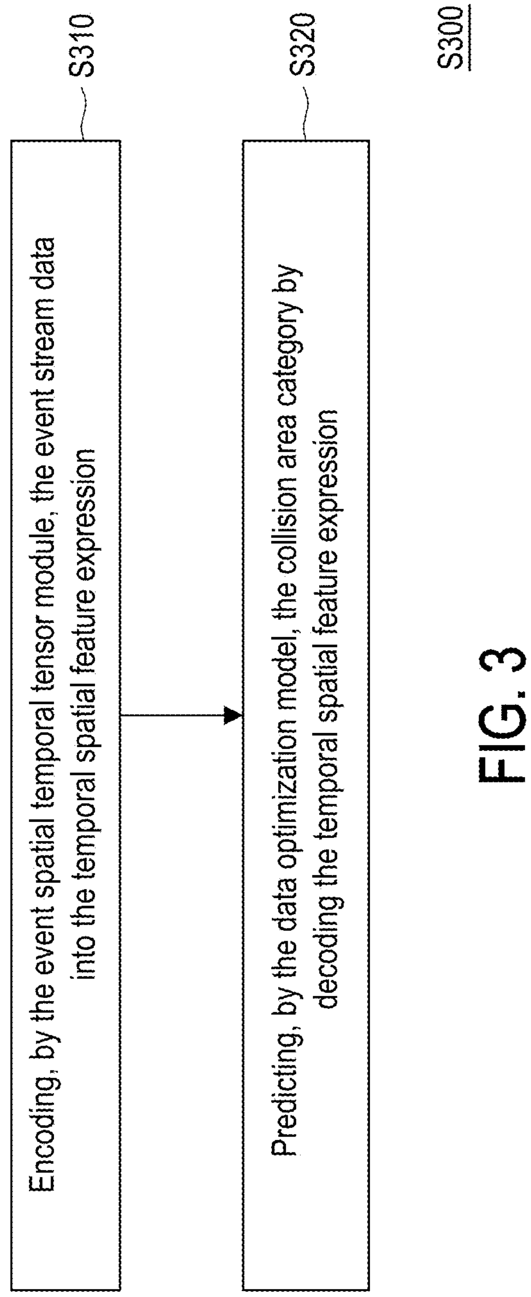
FIG. 3 is a further explanation of step S300 shown in FIG. 2.

FIG. 3 is a further explanation of step S300 shown in FIG. 2. Please refer to FIG. 1, FIG. 2, and FIG. 3 at the same time.

In step S310, the ESTT module 151 may encode the event stream data into a temporal spatial feature expression. In an embodiment, each of the plurality of events may correspond to an image coordinate, a polarity, and a time stamp. The ESTT module 151 may perform a segmentation operation on the event stream data by using a time blocking size to obtain a plurality of time bins. Next, the ESTT module 151 may obtain a new feature value corresponding to each of the plurality of events by using the time stamp, the time blocking size, and the neural network. In an embodiment, the neural network may be a multilayer perceptron (MLP). For the convenience in description, it is assumed that the event stream data E includes "n" events such as $e_1$, $e_2$, $e_3$, . . . until $e_n$, and the time blocking size is assumed to be C. The image coordinate corresponding to the i-th event $e_i$ is assumed to be $(x_i, y_i)$, the polarity is $p_i$, and the time stamp is $t_i$ ("i" is 0, 1, . . . until n−1). It should be noted that the polarity $p_i$ may correspond to changes in log-light intensity, and a value range of the polarity $p_i$ may be {−1,1}. On the other hand, the time stamp $t_i$ may represent the time stamp when the event $e_i$ occurs. After the processor 130 obtains the event stream data E corresponding to the cumulative time interval ΔT by performing the above step S200, the ESTT module 151 may perform a segmentation operation on the event stream data E by using the time blocking size C to obtain C time bins (C=a number of time bins). In other words, each segmented time bin respectively includes a part of the plurality of events such as $e_1$, $e_2$, $e_3$, . . . until $e_n$. Next, for each event, the ESTT module 151 may calculate a new feature value ti' of each event in the time bin. In detail, as shown in Formula 1, for the i-th event $e_i$, the ESTT module 151 may input the time stamp $t_i$ minus a normalized offset $$\frac{C_i}{C-1}$$

to the neural network, and convert an output value of the neural network multiplied by the time stamp $t_i$ to obtain the new feature value ti' of the event $e_i$ in the time bin.

$$t_i' = t_i \times MLP\left(t_i - \frac{C_i}{C-1}\right), \quad \text{(Formula 1)}$$

where "i" is 0, 1, 2, . . . until n−1, $C_i$ is the time bin where the event $e_i$ is located, and "n" is a number of events.

The ESTT module 151 may then generate a temporal spatial feature expression corresponding to each of the plurality of time bins by using the image coordinate, the polarity, and the new feature value. Further, the temporal spatial feature expression may be a voxel, where the image coordinate may correspond to an event image, and a shape of the voxel may be associated with the polarity, the time blocking size, a height of the event image (H), and a width of the event image (W). Following the previous embodiment, each event includes two channels such as positive and negative (the value range of the polarity $p_i$ may be {−1, 1}). After the ESTT module 151 obtains the new feature value ti' respectively by executing Formula 1, the ESTT module stores the new feature value ti' in the corresponding channel. The ESTT module 151 may form the voxel by using an image coordinate of each event after obtaining the new feature value ti' for all events in the event stream data E, and a shape of the voxel is (2, C, H, W). In other words, the voxel (that is, the temporal spatial feature expression) represents a new feature value for each event contained in a specific time bin.

Please continue to refer to FIG. 3. In step S320, the data optimization model 152 may predict the collision area category by decoding the temporal spatial feature expression. In an embodiment, the data optimization model 152 may be a 3D convolutional model. Following the previous embodiment, the processor 130 may input the shape of the voxel (2, C, H, W) into the data optimization model 152 to predict the collision area category.

In an embodiment, the processor 130 may perform a training operation to train the data optimization model 152, where the training operation may be associated with at least one of a curvature algorithm and a pixel number threshold. In detail, the processor 130 may filter out data samples of the trajectory of the dynamic object after the turning point by using the curvature algorithm. In addition, for the event group of the dynamic object, the processor 130 may filter out samples smaller than the pixel number threshold based on the pixel number threshold.

Figure 4:
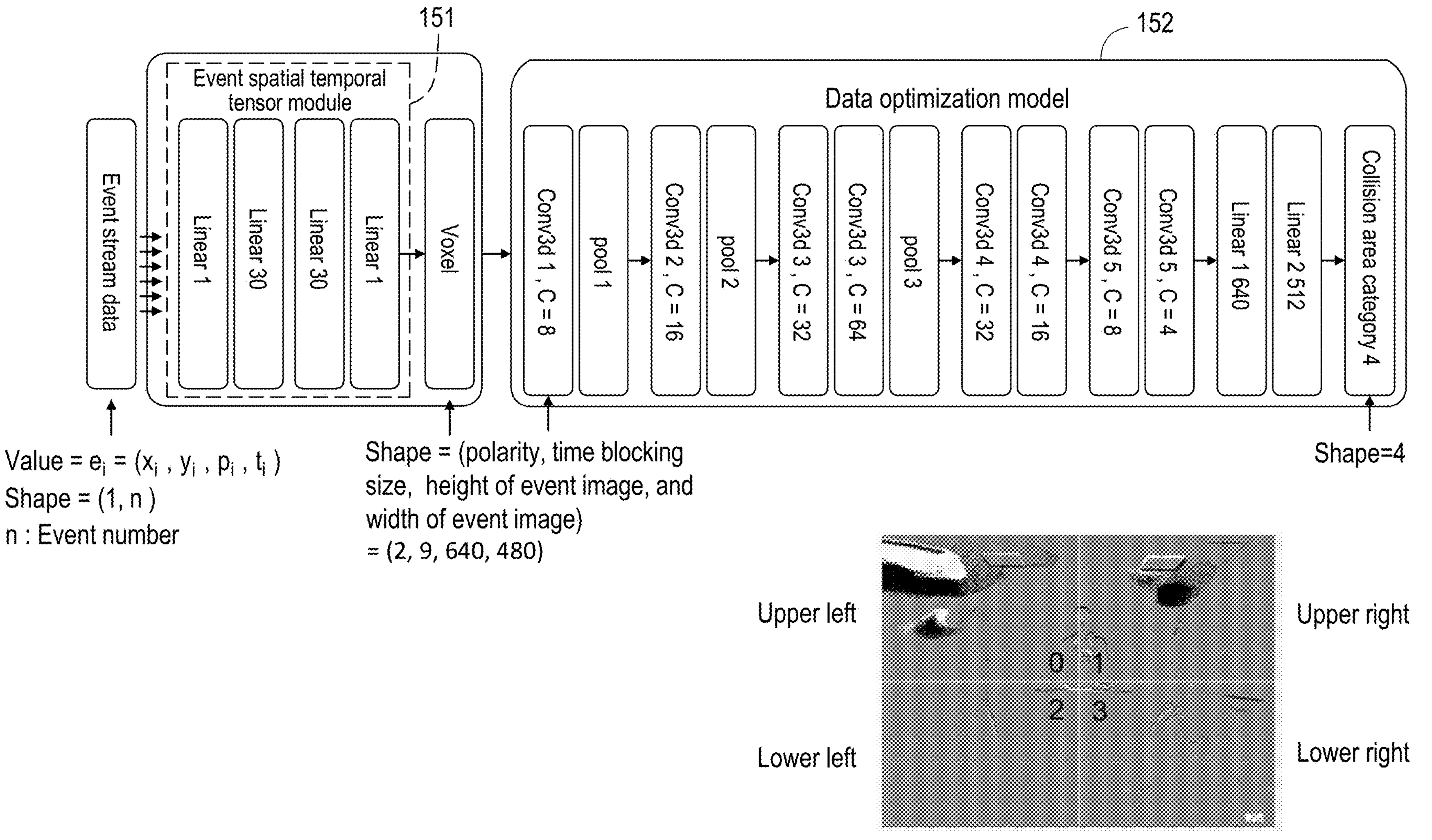
FIG. 4 is a schematic diagram illustrating an operation of an event spatial temporal tensor module and a data optimization model according to an embodiment of the disclosure.

FIG. 4 is a schematic diagram illustrating an operation of an event spatial temporal tensor module 151 and a data optimization model 152 according to an embodiment of the disclosure. Referring to FIG. 1, FIG. 2, FIG. 3, and FIG. 4 at the same time, the ESTT module 151 may input the event stream data into the neural network (MLP) to encode the event stream data into the temporal spatial feature expression by using the method of the above embodiments. Further, the data optimization model 152 may be the 3D convolution model including 5 conv 3D layers and 2 linear layers. The data optimization model 152 may predict the collision area category by decoding the temporal spatial feature expression. For example, collision area categories may include, but are not limited to, upper left, upper right, lower left, and lower right.

Returning to FIG. 2, in step S400, the processor 130 may output the collision area category. In detail, the processor 130 may output the collision area category through a transceiver (unillustrated in FIG. 2) or an input-output device (unillustrated in FIG. 2).

Based on the above, the device and the method for predicting the collision area of the high speed small object of the disclosure may obtain the event stream data based on the event camera. Afterwards, the temporal spatial feature expression is used to predict the collision area category of the high speed small object. Even if the object type of the high speed small object is unknown, the disclosure may effectively predict the collision area category of the high speed small object based on the event stream data, so that the drone or the self-driving car may effectively avoid these high speed small objects.

What is claimed is:

1. A device for predicting a collision area of a high speed small object, comprising:

an event camera; and a processor, coupled to the event camera, wherein the processor obtains a sparse event stream data through the event camera;

the processor obtains an event stream data corresponding to a cumulative time interval by using the sparse event stream data;

the processor predicts a collision area category by using a temporal spatial feature expression associated with the event stream data, wherein the collision area category corresponds to the high speed small object; and the processor outputs the collision area category, wherein the device further comprises a storage medium coupled to the processor, wherein the processor encodes the event stream data into the temporal spatial feature expression;

wherein the storage medium further stores a neural network, wherein the event stream data comprises a plurality of events, and each of the plurality of events corresponds to an image coordinate, a polarity, and a time stamp, wherein the processor performs a segmentation operation on the event stream data by using a time blocking size to obtain a plurality of time bins;

the processor obtains a new feature value corresponding to each of the plurality of events by using the time stamp, the time blocking size, and the neural network;

the processor generates the temporal spatial feature expression corresponding to each of the plurality of time bins by using the image coordinate, the polarity, and the new feature value.

2. The device according to claim 1, wherein the temporal spatial feature expression is a voxel, wherein the image coordinate corresponds to an event image, and a shape of the voxel is associated with the polarity, the time blocking size, a height of the event image, and a width of the event image.

3. The device according to claim 1, wherein the storage medium stores a data optimization model, and the processor accesses and executes the data optimization model, wherein the data optimization model predicts the collision area category by decoding the temporal spatial feature expression.

4. The device according to claim 3, wherein the processor performs a training operation to train the data optimization model, wherein the training operation is associated with at least one of a curvature algorithm and a pixel number threshold.

5. The device according to claim 1, wherein a speed of the high speed small object is greater than 30 m/s, and a size of the high speed small object is less than 2 cm.

6. A method for predicting a collision area of a high speed small object, adaptable for a device comprising an event camera and a processor, wherein the method for predicting the collision area of the high speed small object comprises:

obtaining, by the processor, a sparse event stream data through the event camera;

obtaining, by the processor, an event stream data corresponding to a cumulative time interval by using the sparse event stream data;

predicting, by the processor, a collision area category by using a temporal spatial feature expression associated with the event stream data, wherein the collision area category corresponds to the high speed small object; and outputting, by the processor, the collision area category, wherein the device further comprises a storage medium, wherein predicting the collision area category by using the temporal spatial feature expression associated with the event stream data comprises:

encoding, by the processor, the event stream data into the temporal spatial feature expression;

wherein the storage medium further stores a neural network, the event stream data comprises a plurality of events, and each of the plurality of events corresponds to an image coordinate, a polarity, and a time stamp, wherein encoding the event stream data into the temporal spatial feature expression comprises:

performing, by the processor, a segmentation operation on the event stream data by using a time blocking size to obtain a plurality of time bins;

obtaining, by the processor, a new feature value corresponding to each of the plurality of events by using the time stamp, the time blocking size, and the neural network; and generating, by the processor, the temporal spatial feature expression corresponding to each of the plurality of time bins by using the image coordinate, the polarity, and the new feature value.

7. The method according to claim 6, wherein the temporal spatial feature expression is a voxel, the image coordinate corresponds to an event image, and a shape of the voxel is associated with the polarity, the time blocking size, a height of the event image, and a width of the event image.

8. The method according to claim 6, wherein the storage medium stores a data optimization model, and the processor accesses and executes the data optimization model, wherein predicting the collision area category by using the temporal spatial feature expression associated with the event stream data comprises:

predicting, by the data optimization model, the collision area category by decoding the temporal spatial feature expression.

9. The method according to claim 8, further comprising:

performing, by the processor, a training operation to train the data optimization model, wherein the training operation is associated with at least one of a curvature algorithm and a pixel number threshold.

10. The method according to claim 6, wherein a speed of the high speed small object is greater than 30 m/s, and a size of the high speed small object is less than 2 cm.

* * * * *